No. 841,826. PATENTED JAN. 22, 1907.
A. TINDEL.
MECHANISM FOR HOLDING CRANK SHAFT PINS IN TURNING LATHES.
APPLICATION FILED NOV. 20, 1905.
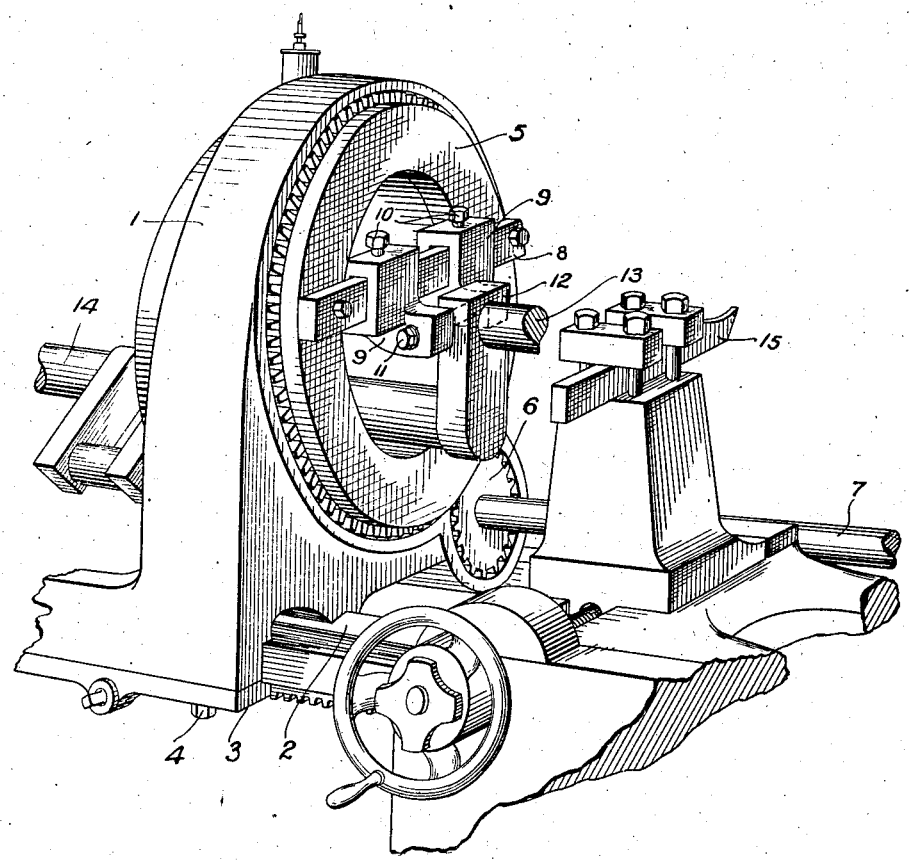
WITNESSES:-
INVENTOR:-
BY
ATTORNEY.

UNITED STATES PATENT OFFICE.

ADAM TINDEL, OF PHILADELPHIA, PENNSYLVANIA, ASSIGNOR TO TINDEL MORRIS COMPANY, OF EDDYSTONE, PENNSYLVANIA, A CORPORATION OF PENNSYLVANIA.

MECHANISM FOR HOLDING CRANK-SHAFT PINS IN TURNING-LATHES.

No. 841,826.    Specification of Letters Patent.    Patented Jan. 22, 1907.

Application filed November 20, 1905. Serial No. 288,166.

*To all whom it may concern:*

Be it known that I, ADAM TINDEL, a citizen of the United States, residing at Philadelphia, in the county of Philadelphia and State of Pennsylvania, have invented new and useful Mechanism for Holding Crank-Shaft Pins in Turning-Lathes, of which the following is a specification.

This invention is a detail improvement on the construction shown in Letters Patent of the United States No. 666,040, dated January 15, 1901, and it is more particularly a species of chuck carried by a revolving ring, whereby an intermediate crank of a crank-shaft can be firmly gripped close to the pin and supported close to the ring, so that in the operation of turning the pin is held firmly in the center of revolution without vibration or sagging, which commonly takes place in mechanisms of this class heretofore employed.

In the accompanying drawing is shown a perspective view of the invention with the chuck engaging an intermediate crank of a crank-shaft, the turning-tool being moved aside for the purpose of better illustrating the features of the invention.

As shown in the drawing, the invention comprises a yoke 1, movable longitudinally on the lathe-shears 2 and secured in the desired position in any suitable manner, as by clamps 3 and bolts 4. Revolubly supported within the yoke is a carrier in the form of an externally-toothed or spur ring 5, adapted to be revolved by a pinion 6, the latter being splined on the shaft 7 so as to be movable longitudinally thereon and revoluble thereby. Fixed to the face of the ring 5 is a bar 8, having sleeved thereon the angular jaws 9, which are adjustable on the bar and adapted to be fixed thereto by the set-screws 10. These jaws have a bolt 11 passed therethrough parallel and close to the bar, whereby the jaws are firmly clamped to a crank 12 in line with the pin 13 of a crank-shaft 14, extending through the ring, the pin being held and revolved with its axis coincident with the axis of revolution of the ring during the operation of turning the pin's surface by the tool 15.

This construction has been found to provide satisfactory means for overcoming in a simple manner the difficulties heretofore found in holding intermediate cranks so that the pins thereof can be turned without trembling or deviating from the desired position.

Having described my invention, I claim—

1. A revoluble carrier with an opening therethrough, a bar fixed to said carrier and disposed across said opening, jaws adjustable on and fixable to said bar, and means for clamping said jaws to the work.

2. A yoke, a toothed ring revoluble in said yoke, a pinion engaging and revolving said ring, a bar extending across and fixed to said ring, a pair of jaws sleeved on said bar and fixable thereto, and means for clamping said jaws to the work.

In testimony whereof I have hereunto set my hand, this 17th day of November, 1905, in the presence of the subscribing witnesses.

ADAM TINDEL.

Witnesses:
W. ELLIOTT HAZZARD,
G. N. CRISPIN.